M. CORRINGTON.
FLUID PRESSURE BRAKE APPARATUS.
APPLICATION FILED JUNE 10, 1905.
1,110,300. Patented Sept. 8, 1914.
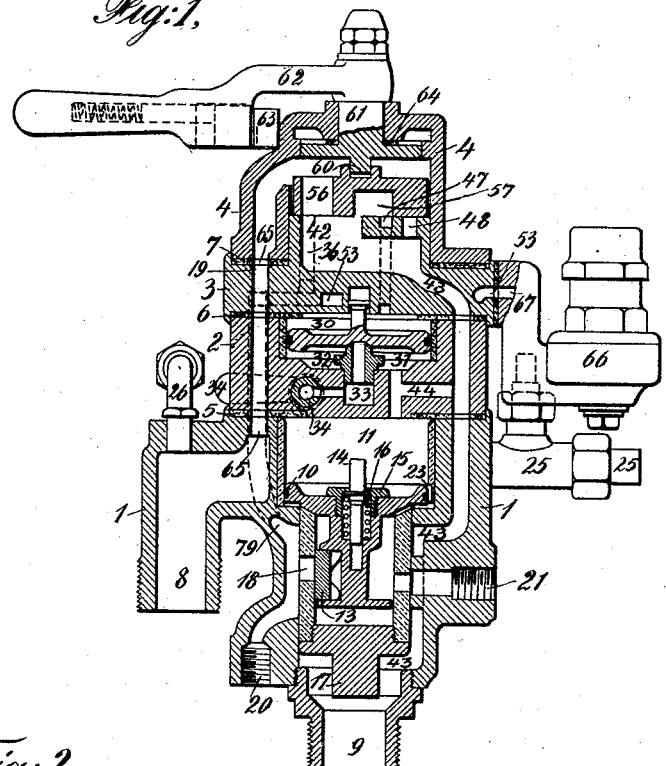
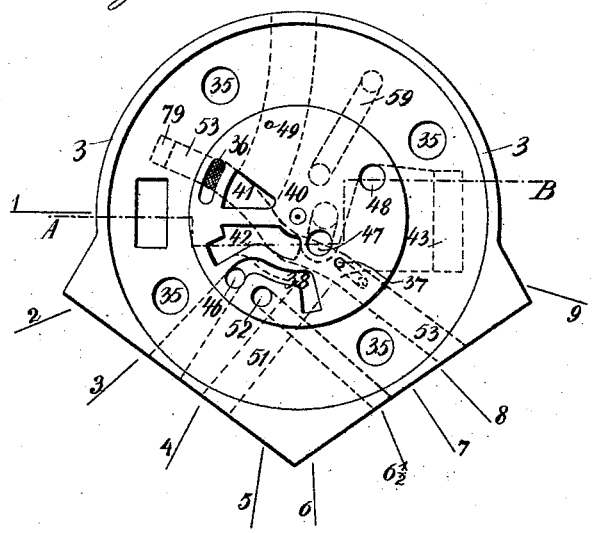
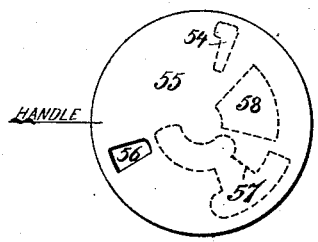
Witnesses
Max B. A. Doring.
M. M. Evans.
Murray Corrington
Inventor.

UNITED STATES PATENT OFFICE.

MURRAY CORRINGTON, OF NEW YORK, N. Y., ASSIGNOR, BY MESNE ASSIGNMENTS, TO THE WESTINGHOUSE AIR BRAKE COMPANY, OF PITTSBURGH, PENNSYLVANIA, A CORPORATION OF PENNSYLVANIA.

FLUID-PRESSURE BRAKE APPARATUS.

1,110,300.              Specification of Letters Patent.      Patented Sept. 8, 1914.

Application filed June 10, 1905. Serial No. 264,599.

*To all whom it may concern:*

Be it known that I, MURRAY CORRINGTON, a citizen of the United States, residing at New York city, in the county and State of New York, have invented certain new and useful Improvements in Fluid - Pressure Brake Apparatus, of which the following is a specification.

My invention relates to improvements in fluid-pressure brake mechanism, and has for its object more particularly the better control of railway-vehicles by enabling an engineer to hold his train under a more certain and continuous brake control than is feasible with the brake systems heretofore commonly in use.

Referring to the drawings, Figure 1 is a vertical section through a valve mechanism embodying my improvements, essentially on the irregular line A B of Fig. 2. Fig. 2 is a top or plan view of casing-section 3 and the rotary valve-seat of Fig. 1. Fig. 3 is a top view of the rotary valve which operates on said seat.

Referring to Fig. 1, the general construction consists of casing-sections 1, 2, 3 and 4, with gaskets 5, 6 and 7 interposed between sections 1 and 2, 2 and 3, and 3 and 4, respectively. Section 1 of the casing has a nozzle 8 for connection with the main reservoir or air pump and a hollow cap or plug 9 for connection with the brake pipe of the system. A piston 10 moves in a chamber 11 and operates a valve 13. Within the piston 10 a stem 14 is secured in place by a screw cap 15 and is held in the position shown by the spring 16. A cap 17 closes communication between the chamber in which the piston 10 and valve 13 operat and the train-pipe connection 9. The casing 1 has two ports 20 and 21, which are to be connected, respectively, with one or more brake-cylinders and one or more reservoirs.

Considering sections 2 and 3, with reference more particularly to Figs. 2 and 3, section 2 embraces a piston-chamber, in which operates a piston 31, whose under side rests normally upon a valve 32, held in fixed relationship to the casing-section and having a port or passage 33 leading to the atmosphere through cock 34, which when at right angles to the position shown, closes port 33.

Section 3 has a seat 40, through which extends a large port 41, leading out to the atmosphere, as shown in dotted lines (Fig. 2,) and a large train-pipe port 42, leading to the right and downward, Fig. 1, and thence by passage 43 through casing-sections 2 and 1 and the cap 9 to the train-pipe. A branch passage 44 leads off from 43 and dividing admits train - pipe pressure to the under side of piston 31 and to chamber 11. From the valve-seat 40 port 46 extends downward and to the outer edge of the casing, as seen in dotted lines. A port 47 leads from said valve-seat to the upper end of piston-chamber 30, Fig. 1. A port 48 leads from said seat downward into the train-pipe cavity 42 43, and a small port 49 leads from said valve-seat into the large exhaust cavity 41. From the side of the casing to which the passage 46 extends, a passage 51 leads into the train-pipe cavity 42 43. All these passages are shown in dotted lines in Fig. 2. A passage 52 leads to the outside of the casing, and from the same side of the casing a passage 53 extends through the casing-section 3 and terminates in the passage 79. A port 36 and a smaller port 37 lead from the valve-seat 40 into the passage 53. A channel or groove 38, preferably of substantially the shape illustrated, is cut in the valve-seat 40 leading into the port 46. The passage 53 extending through the casing passes under the passages 42—43 and ports 41 and 47, as shown in dotted lines, the casing-section being thick enough to permit this arrangement, just as passages 52 and 51 cross each other without communicating, and the ports 41 and 47 running off away from passage 53 as they pass downward through the casing.

Fig. 3 shows the rotary valve 55, which is to be moved to the left and placed in position upon the valve-seat 40, the central hole in the seat 40 accommodating a corresponding pin on the under side of the valve 55. so as to keep it concentric with its seat. Said valve has a port 56 through it, a cavity 57, consisting of connected inner and outer arcs or curved portions, a cavity 58 and a smaller cavity 54 on its under side, as shown in dotted lines. The top of said valve may have the usual slot or mortise, into which a correspondingly - shaped key 60 fits accurately (see Fig. 1) for operating the same. A cavity or passage 59 is cored from the under side of casing-section 3 in such manner that one end of said passage communicates with the upper end of piston-chamber 30, while the other end leads downward through casing-section 2 and communicates with a corresponding passage in casing-section 1 and thence by the pipe or passage 25 to the usual equalizing-reservoir. It is not deemed necessary to further illustrate said passage 59 than as seen in Fig. 2, since it is a well-known construction familiar to those skilled in the art for keeping the upper end of the equalizing piston-chamber 30 open to an equalizing-reservoir. The pipe 26, Fig. 1, is for the usual gage and governor connection.

Casing-section 4 incloses the rotary valve 55, and through its center a shaft 61 extends, having at its lower portion a key 60 and at its upper end the handle 62 for operating said shaft, and thereby the rotary valve 55, all arranged in the usual manner. A spring-stop 63 is carried by the handle 62 and is arranged to hold the handle in the various positions to which it is moved in operating the valve 55. A gasket 64 prevents air from leaking out around the shaft 61. It is to be understood that pressure from the main reservoir or pump flows by the nozzle 8 and the passage 65 and is always present above the valve 55.

Going to Fig. 2, it is to be understood that the passages 46 and 51 are so arranged that a pressure-reducing valve device may be attached to the casing-section, so that fluid under pressure may be admitted into the passage 46, whence it will flow to the outer section of the casing and through the pressure-reducing valve device and thence by the passage 51 into the train-pipe chamber and passage 42, 43. This is for the purpose, known to all skilled in the air-brake art, of keeping the train-pipe pressure regulated at a definite amount even though the pressure in the main reservoir may vary. The passages 52 and 53 in Fig. 2 are arranged for a similar reducing-valve, and ports 46 and 52 are intended to be open to main-reservoir pressure when the valve 55 is turned to such position that the port 56 stands over one or the other of said ports. In Fig. 1, at the right, is shown in outline a pressure-reducing device 66 occupying the proper position for controlling the ports 52 and 53, that section of the device into which the pressure 52 would enter, as well as the passage itself, being cut away. It is to be understood that with this pressure-reducing device in position air from the main reservoir or pump going through passage 52 and the reducing device 66 is reduced to a pressure corresponding to the adjustment of the device and thence flows by the passage 67 into the passage 53. I do not deem it necessary to illustrate or describe more fully a pressure-reducing valve, since it is thoroughly understood in the air-brake art, as well as in mechanics, and it is to be understood that any other suitable device through which fluid under a higher pressure can be delivered into a passage or chamber at such lower pressure as is desired and that lower pressure constantly maintained will answer equally well. The passage 79 into which passage 53 leads goes downward through casing-sections 3, 2 and 1, until it is placed in communication with ports 18 and 20. This can be easily traced in dotted lines in Fig. 1. Suffice it to say that passage 79 may be carried in any convenient manner, preferably through the casing-sections, until it is placed in communication with the port 18 and passage 20, and it may follow the same course as passage 79 in my Patent No. 762,282.

The operation of the mechanism can now be readily understood. Fluid under pressure from the main reservoir or air-pump being supplied to the nozzle 8 flows upward through passage 65 into the chamber around and above the rotary valve 55. The position of valve 55 in Fig. 1 is what is known as the "release" position, in which pressure from the main reservoir flows downward through port 56 into train-pipe port 42, thence by passage 43 and the train-pipe nozzle 9 to the train-pipe of the brake system and the various triple valves on the cars. This pressure from the train-pipe likewise goes by the passage 44 to the under side of the piston 31 and into the upper end of a piston-chamber 11, where it forces the piston 10 and its connected parts into normal position, (seen in Fig. 1,) in which the port 23 is opened, allowing the pressure to go past the piston into the valve-chamber and thence by the passage 21 to charge the auxiliary reservoir connected therewith. At the same time the train-pipe pressure in chamber 42—43 flows into cavity 57, Fig. 1, and thence through 47 to the upper side of the piston 31, thereby keeping said piston normally balanced and held in the position shown in Fig. 1.

The handle 62, which operates the valve 55, has several different positions into which it may be moved, indicated in Fig. 2 from 1 to 9 inclusive. In position No. 1 the port 56 stands over the large train-pipe port 42, which has just been described. In position No. 2 the port 56 stands over the port 46, thus admitting pressure through the passage 46 and its appropriate pressure-reducing valve, thence by the passage 51 into the train-pipe. In position No. 3 the port 56 stands over the port 52, when the pressure flows through the last-mentioned port and the appropriate pressure-reducing valve and thence by the passages 79 and 20 and the cylinders connected therewith. In all three of these positions the train-pipe cavity is kept in communication with the upper end of the piston-chamber 30 by means of ports 42 and 47 and the cavity 57. In position No. 4 the port 56 passes to the right of port 52. In positions No. 5 and No. 6 the small cavity 54 connects ports 36 and 41. In positions 3, 4 and 5 port 56 stands over channel 38 and supplies air to port 46, but not so in position 6; in positions 4, 5 and 6 cavity 57 connects ports 47 and 48, keeping piston 31 balanced; in position No. 6½ port 56 supplies air to port 37 and thence by 53 and 79 to 20; in position No. 7 all ports are closed; in position No. 8 cavity 57 connects ports 47 and 49; and in position No. 9 cavity 58 connects the large ports 41 and 42.

To prepare the system for operation the handle 62 may be moved to position No. 1 admitting pressure through ports 56, 42, 43 &c., to charge the system to the desired amount and release brakes on the train if they are applied, then the valve is moved to position No. 2 the ordinary running position with brakes off, which supplies pressure to the desired amount through the ports 56, 46 and the appropriate regulating device. If it is desired to apply the brakes throughout the train the valve is turned to position No. 8 so as to bring the outer arc of cavity 57 over the preliminary exhaust port 49 while the inner arc of the cavity remains over the port 47, thus releasing through a small port pressure from the upper side of the piston 31 and the equalizing reservoir. Five or ten pounds having been exhausted from the upper side of the piston 31 the brake valve is returned to position No. 7 or "Lap," when the train-pipe pressure underneath the piston lifts it from the valve 32 and flows to the atmosphere through the passage 33 until the pressure below the piston is slightly less than that above, when the piston moves down gradually and closes the port 33. This is known as the usual "Service" application of the brakes. To set the brakes in emergency, the valve is turned to position No. 9, when the cavity 58 connects the large ports 41 and 42, thus exhausting air rapidly from the train-pipe directly to the atmosphere and causing the emergency operation of the triple valves throughout the train.

Upon the operation of the valve 55 and the equalizing-piston 31 for setting the brakes in service the piston 10 moves upward until the stem 14 strikes the bottom of the casing 2, causing valve 13 to partly uncover port 18 and admit pressure from auxiliary reservoir through ports 18 and 20, to the brake cylinder. In the emergency action the graduating spring 16 yields, permitting piston 10 to move to the upper end of its chamber and draw the valve 13 clear across port 18. If the brakes whose cylinders are connected to the port 20 are to be operated in the usual manner, they may be set with the force desired by the movement of the brake valve handle 62. To release the brakes on the train, air is admitted into the train-pipe, which also moves the piston 10 and valve 12 downward to the position shown, so that the reservoir may be recharged while the engine brakes are held on, and these operations may be repeated, recharging the reservoir, admitting more pressure to the cylinder, and keeping the engine brakes continuously applied as long as desired without releasing, the triples on the cars moving to release meanwhile.

If it is desired to apply brakes on the engine without applying them on the cars, the valve is moved to position No. 3, when the air flows through ports 56, 52, the pressure-reducing device, and thence by passages 53, 79 and 20 to the brake cylinders, the pressure-regulator 66 limiting the amount of the flow, provided the valve is left in that position. When the desired pressure has been admitted to the cylinders, which may be determined by a gage connected therewith, the valve is moved to position No. 4, which shuts off the flow. To reduce pressure in the engine cylinders, the valve is moved to position No. 5, when cavity 54 in the valve face connects ports 36 and 41, thus exhausting pressure from the cylinders through 20, 79, 53, 36, 54 and 41. By operating the valve, therefore, between positions 3, 4 and 5, the pressure in the engine cylinders may be increased, diminished or held constant at will. In all three of these positions the port 56 registers with channel 38 and keeps any leak in the train-pipe throughout the train supplied through the ports 46 and 51, so that the brakes on the cars will not be applied. Again, after the brakes have been set throughout the train, as heretofore explained, the pressure in the engine cylinders may be held constant by keeping the valve in position 7, and any leakage may be supplied, or the pressure in the cylinders increased, by moving the valve to position 6½ when the port 56 stands over port 37, or the pressure in the engine cylinders may be released to any extent desired by moving the valve to position No. 6, when the cavity 54 connects ports 36 and 41, while the port 56 stands at the right of channel 38. In both positions 5 and 6 of the valve it will be observed that the cavity 54 connects ports 36 and 41, and releases pressure from the engine cylinders, the difference being that in position 5 air is admitted through 56, 38 and 46 into the train-pipe, which will release the brakes on the train, while in position 6 air is released from the engine cylinders without admitting pressure into the train-pipe. The port 37 may be cored or drilled obliquely into passage 52 instead of 53.

It will be readily observed that the valve structure herein illustrated is particularly adapted to be placed under the immediate care of and operated directly by the engineer, and it is particularly applicable for controlling the brakes on the engine or on both engine and tender. The device herein illustrated may be employed to operate both the engine and tender brakes, or it may be employed to operate the engine-brakes only, allowing the tender-brakes to be operated in the usual manner. In any event I prefer that the triples on the cars shall be connected to the train-pipe by the usual branch-pipe connections in the ordinary manner, though it is evident that the cylinders of one or more cars may be connected to port 20 as described above with reference to the tender.

From the above description of the operation of the apparatus it is evident that I may operate the mechanism so that the brakes on the engine may be released at the time the brakes on the cars are released for recharging the reservoirs or the brakes on the cars may be released for recharging while the brakes on the engine are held applied, after which the engine brakes may be released independently. This is all accomplished by the movement of the handle 62. By moving the handle 62 between positions 3, 4 and 5 or between positions 6, 6½ and 7 the pressure may be admitted to and released from the engine brake-cylinders or held at any pressure desired from one pound up to the full maximum permitted by the reducing-valve 66.

In case of leaks from the engine-cylinders the pressure can be fully restored by moving the valve 62 as above explained.

With my apparatus herein described on the second of two engines, the brakes on the train being controlled from the head-engine, the handle 62 is placed on position No. 7 and the cock 34 turned to close port 33.

In the mechanism illustrated the arrangement of the parts is such that whenever the valve-handle 62 is operated for automatic application of the brakes the piston 10 and valves operated thereby are shifted to the position for opening the port 18, and consequently the engine-brakes will always be applied on each reduction of pressure in the train pipe, and hence any accidental bursting of the train-pipe or breaking in two of the train will certainly apply the brakes throughout the train, which may by many be considered an advantage. With the apparatus operating in this manner, in order to set in motion the alternate system of application and release between engine and cars above described, the engineer first applies brakes throughout the train by operating the handle 62 between positions 7 and 8, then operates the handle 62 to position 6 and holds engine-brakes at release until the time arrives for releasing and recharging on the cars, when he applies on the engine by moving handle 62 to position No. 3, or to No. 1 and then back to No. 3, and releases on the cars &c.

At all times and under all circumstances the engineer has complete control of the pressure in the engine-brake cylinders by reason of the free and open passage 79, with which nothing in the whole valve structure is permitted to interfere, being placed under control of the valve 55, permitting either the admission or exhaust of pressure to or from the cylinders or its retention at any desired amount. The engineer has perfect control over the valve 55 and all the functions it performs through the handle 62.

While I have described the above mechanism with reference more particularly to its application upon an engine and a new manner of operating the engine-brakes, either separately or in combination with the brake apparatus upon a railway-car, I do not limit its use to what is usually understood as a steam engine or locomotive, because it is apparent that it may be placed upon any car or other vehicle which is used to carry either freight or passengers and which carries its own motor—as, for instance, an electrical motor or trolley-car. In the within specification and claims, therefore, whenever I speak of applying and releasing brakes on an engine I mean, broadly, any engine, locomotive, or motor which is used either for self-propulsion or for the purpose of drawing any other car or vehicle, and I propose to employ the within-described apparatus and its double method of applying and releasing brakes either for the purpose of controlling such engine or motor alone or in combination with any car or vehicle which such engine or motor is hauling.

From what I have said above it is apparent that my apparatus herein illustrated and described is capable of operation as an engine-brake system in connection with the regular automatic-brake system upon the cars in either of the following manners:

First. It may be operated merely as part of the regular automatic-brake system, setting the brakes on the engine at the same time they are set upon the cars and releasing on the engine and cars at the same time before recharging the reservoirs.

Second. The engine-brakes may be operated to apply at the same time that brakes are applied on the cars, then held in application while the auxiliary reservoir on the engine is recharged, while brakes on the cars are released and reservoirs recharged.

Third. The brakes on the engine may be applied and the pressure varied up or down at will without applying brakes on any of the cars. This may often happen to be very advantageous in switching or when it is desired to steady the train without waste of time or of air involved in applying and releasing throughout the train.

Fourth. The brakes may be set on engine and cars and then the pressure in the engine cylinders either held constant or increased or reduced at will while holding the brakes applied on the cars.

Fifth. The brakes may be applied on engine and cars alternately, holding them on the engine while releasing and recharging on the cars and then, after reapplying on the cars, either reducing the pressure on the engine-brakes to the minimum or releasing on the engine entirely. This will doubtless be of great advantage for controlling the train, particularly on a grade where the brakes may be applied throughout the train, then released on the engine until the time comes for recharging reservoirs when the brakes may be set upon the engine with the maximum force permitted while the brakes are released and the reservoirs recharged upon the cars, when, after reapplying on the cars, the engine-brakes may be again released until the time arrives for the next recharging on the cars. This alternate operation of the engine-brakes and the car-brakes, particularly on a grade, will allow the train to be held under continuous brake-control without risk of over-heating the wheels either on the engine or on the cars.

I count it one of the principal features of my apparatus in connection with the standard apparatus on the cars that I produce an alternate brake system capable of operating either conjointly or alternately between engine and cars, holding engine-brakes on while releasing and recharging on cars, and then while holding brakes applied on the cars releasing on the engine.

In my prior Patent No. 762,282, dated June 14, 1904, there was disclosed, I believe for the first time, an alternate automatic brake system capable of alternate as well as conjoint action between engine and cars. In my within application I disclose a modified system for accomplishing a part or all of the results set forth in my earlier patent, by the movements of a single valve handle or lever, and I do not deem it necessary to illustrate more than one form of apparatus embodying my invention.

I claim:

1. In a fluid-pressure brake system, the combination, with a train-pipe normally charged with pressure, of apparatus on an engine and apparatus on a car capable of operation by a reduction of train-pipe pressure to apply brakes and means capable of operation by a single handle under control of the engineer for alternately holding brakes applied on the engine while releasing brakes on the car, and vice versa.

2. In a fluid-pressure brake system, the combination of mechanism on a car and mechanism on an engine automatically operative to apply brakes on a reduction of pressure in a train-pipe, and mechanism capable of operation by a single handle under control of the engineer for, at one time, alternately releasing brakes on the engine while holding brakes applied on the car, and vice versa, and, at another time, applying and releasing brakes conjointly on the engine and car.

3. The combination, with a brake-cylinder, an auxiliary reservoir and a triple valve on a car, of a brake-cylinder, an auxiliary reservoir and a valve device automatically operative to apply brakes on an engine and a valve mechanism capable of operation by the engineer through a single handle for controlling said apparatus on car and engine, and for applying and releasing brakes, at one time alternately and at another time conjointly between engine and car.

4. In a fluid-pressure brake system, the combination, with a triple valve and a brake-cylinder on a car, a valve device automatically operative to apply brakes and a brake-cylinder on an engine, of means capable of operation by a single handle under control of the engineer for alternately releasing the brakes on the engine while the brakes on the car are set, and for holding brakes applied on the engine while releasing on the car.

5. In a fluid-pressure brake system, the combination, with a triple valve and a brake-cylinder on a car, a valve device automatically operative to apply brakes and a brake-cylinder on an engine, of means, capable of control by the engineer through the movement of one handle for operating said triple and automatic valve device to application and release or normal positions, and for alternately releasing and applying brakes on the engine while the triple on the car is, respectively, in positions for applying and for releasing brakes.

6. In a fluid-pressure brake system, the combination of an automatic valve device operative by a reduction of pressure in a brake-pipe to admit pressure into a brake cylinder, an unobstructed passage leading to said cylinder, which is independent of said automatic valve device, and means identical with the brake valve proper operated by the engineer for admitting pressure to the cylinder through said passage and for controlling said pressure after its admission independently of the position of said automatic valve device.

7. In a fluid-pressure brake system, the combination, with a brake-cylinder and a valve device automatically operative to apply brakes on an engine, of a valve-seat for the brake valve proper, a free and unobstructed passage leading from said valve-seat to said cylinder and a brake valve on said seat capable of operation by the engineer for controlling the flow of pressure through said passage and at the same time controlling all exits from said cylinder, whereby any desired pressure may at any time be admitted to said cylinder and maintained or increased or decreased at will.

8. The combination, with a valve device controlling the admission of pressure to a brake-cylinder, of means the same as the brake valve proper, capable of control by the engineer and including a passage independent of the movement of said valve device for admitting pressure to and exhausting it from the cylinder and an unobstructed passage from said valve device to the cylinder which may always be opened instantly said valve device moves to application position.

9. In a fluid pressure brake system, the combination of mechanism on a car and mechanism on an engine automatically operative to apply brakes on a reduction of pressure in a train pipe, and mechanism capable of operation by a single handle under control of the engineer for, at one time, alternately admitting pressure to the train pipe and to an engine brake cylinder, and, at another time, admitting pressure to the train pipe and cylinder conjointly.

10. The combination, with a brake cylinder, an auxiliary reservoir and a triple valve on a car, of a brake cylinder, an auxiliary reservoir and a valve device automatically operative to apply brakes on an engine and a valve mechanism capable of operation by the engineer through a single handle for controlling said apparatus on car and engine, and including ports for admitting pressure to an engine brake cylinder and to a train pipe, at one time alternately and at another time conjointly.

11. The combination, with a brake cylinder, an auxiliary reservoir and a triple valve on a car, of a brake cylinder, an auxiliary reservoir and a valve device automatically operative to apply brakes on an engine and a valve mechanism capable of operation by the engineer through a single handle for controlling said apparatus on car and engine, and including ports for at one time admitting pressure to a train pipe and to an engine brake cylinder and at another time to the train pipe only.

12. An engineer's brake valve for fluid pressure brake system, comprising, in combination, ports and passages for effecting train brake service, ports and passages for effecting engine brake service and release, a single manually movable element to control pressure for both train and engine brakes, means whereby the engine brake application and release may be manually effected independently of train brake application and release, and automatic means for securing engine brake application upon reduction of train line pressure.

13. In a fluid pressure brake system, the combination with automatic mechanism for operating the brakes on a car, of a cylinder containing a piston whose movements through the admission and exhaust of pressure to and from said cylinder cause brakes to be applied and released on an engine, an auxiliary reservoir, a triple valve device actuated by increase of pressure in a train pipe to charge said reservoir and by decrease of pressure in said pipe to admit pressure from said reservoir to said cylinder, and means capable of control through the handle of an automatic brake valve and including a release passage from said cylinder, which is independent of and uncontrolled by the moving parts of said triple valve device, whereby the brakes on engine and car may be released, at one time together by admitting pressure to said train pipe while opening the release passage from said cylinder, and at another time separately by first admitting pressure to said train pipe and afterwards opening the release passage from said cylinder, independently of the position of said triple valve device.

14. In a fluid pressure brake system, the combination, with a triple valve, an auxiliary reservoir and a brake cylinder on a car, a cylinder containing a piston whose movements through the admission and exhaust of pressure to and from said cylinder cause brakes to be applied and released on an engine, an automatic valve device operative by reduction of pressure in a train pipe for admitting pressure to said engine cylinder and means capable of control through the handle of an automatic brake valve and including a release passage from said engine cylinder which is independent of and uncontrolled by the moving parts of said automatic valve device, whereby engine brakes may be released at one time while releasing car brakes and at another time after releasing car brakes, through the movement of said handle, independently of the position of said automatic valve device.

15. In a fluid pressure brake system, the combination of a cylinder containing a piston whose movements through the admission and exhaust of pressure to and from said cylinder cause brakes to be applied and released, a valve mechanism automatically operative by reduction of pressure in a train pipe to admit pressure to said cylinder and means capable of operation through the handle of an automatic brake valve and including a passage which is independent of and uncontrolled by the moving parts of said automatic valve mechanism, whereby the engineer may at one time admit pressure to said train pipe while exhausting pressure from said cylinder, and at another time admit pressure to said train pipe while retaining the pressure in said cylinder, through the movement of said handle, independently of the position of said automatic valve device.

16. In fluid pressure brake systems, the combination, with automatic mechanism for securing application of brakes on engine and train upon reduction of train line pressure, of an engineer's brake valve, including ports and passages for effecting engine and train brake service, ports and passages for effecting train brake release and ports and passages for effecting engine brake release which are independent of and uncontrolled by said automatic mechanism, and means operated by a single manually movable element to control said ports and passages and to secure in one position release of train brakes and in another position release of both engine and train brakes.

17. In a fluid pressure brake system, the combination, with automatic mechanism for securing application of brakes on an engine and a car by reduction of pressure in a train line, of an engineer's brake valve operated by a single manually movable element, and including ports and passages for effecting the conjoint application of brakes on engine and car, and ports and passages which are independent of and uncontrolled by the moving parts of said automatic mechanism for effecting the separate application of brakes on engine while releasing brakes on the car.

18. An engineer's valve for fluid pressure brake systems involving distinct train and engine brake services, comprising, in combination, a rotary valve-seat, having the usual ports and passages for effecting train brake service, independent ports and passages in said valve seat for effecting engine brake service independently of train brake service, and a single rotary valve device mounted on said seat and provided with ports and passages to control both engine and train brake ports and passages in the valve seat.

19. An engine brake equipment, comprising the combination with a main reservoir, train pipe, and mechanism operating in response to variations in train pipe pressure to apply the engine brakes, of an engineer's brake valve having positions and ports for controlling the supply of air to and its release from the train pipe to operate the engine and train brakes, and other positions with ports for applying the engine brakes with ports for applying the train brakes and for independently of the train brakes and for feeding air to the train pipe to compensate for leakage therein while the engine brakes are independently applied.

20. An engine brake equipment, comprising the combination with a main reservoir, train pipe, and mechanism operating in response to variations in train pipe pressure to apply the engine brakes, of an engineer's brake valve having a running position with ports for releasing the engine brake and supplying air to the train pipe, an engine application position for applying the engine brakes with the train pipe closed, and another position for applying the engine brakes, and for supplying air to the train pipe to recharge the same.

21. An engineer's valve for fluid pressure brake systems involving distinct train and engine brake service, comprising, in combination, a rotary valve-seat having the usual ports and passages for effecting train brake service, ports and passages in said valve seat for effecting engine brake service and release independently of train brake service and release, and a single rotary valve device mounted on said seat and provided with ports and passages to control both engine and train brake ports and passages in the valve seat.

22. In a fluid pressure brake system having automatic train brake service and separate engine brake service, the combination with a main reservoir and train pipe, of an engineer's brake valve having a running position with ports and passages for releasing engine brakes and for feeding air to the train pipe, a lap position with both the train pipe and the engine brake cylinder passage closed, another position for applying engine brakes and feeding air to the train pipe, and a further position for applying engine brakes with the train pipe closed.

23. An engineer's brake valve provided with ports communicating with the atmosphere, train pipe, main reservoir, equalizing reservoir and a brake cylinder, and a valve provided with cavities and passages coöperating with said ports and arranged in running position to connect the main reservoir with the train pipe and the equalizing reservoir and blank the brake cylinder port, and in another position to connect the main reservoir with the brake cylinder port and blank the train pipe and equalizing reservoir ports.

24. An engineer's brake valve provided with ports communicating with the atmosphere, train pipe, main reservoir, equalizing reservoir and a brake cylinder, and a valve provided with cavities and passages coöperating with said ports and arranged in running position to connect the main reservoir with the train pipe and the equalizing reservoir and blank the brake cylinder port, in another position to connect the main reservoir with the brake cylinder port and blank the train pipe and equalizing reservoir ports, and in a third position to connect the equalizing reservoir port with the atmosphere and blank the train pipe and brake cylinder ports.

25. An engineer's brake valve provided with an exhaust, train pipe, main reservoir, equalizing reservoir and two brake cylinder ports, and a valve provided with cavities and passages coöperating with said ports and arranged in running position to connect the main reservoir with the train pipe and equalizing reservoir ports, in service position to blank the train pipe port and brake cylinder port and connect the equalizing reservoir port with the atmosphere, in another position to blank the equalizing reservoir, exhaust and train pipe ports and connect the main reservoir port with one of the brake cylinder ports, and in a fourth position to connect the other brake cylinder port with the atmosphere and simultaneously blank the equalizing reservoir and train pipe ports.

26. An engineer's brake valve provided with ports communicating with the atmosphere, train pipe, main reservoir, equalizing reservoir and a brake cylinder, and a valve provided with cavities and passages coöperating with said ports and arranged in one position to blank the train pipe and brake cylinder ports and connect the equalizing reservoir port with the atmosphere, in a second position to connect the main reservoir with the brake cylinder and blank the train pipe, equalizing reservoir and exhaust ports, in a third position to connect the main reservoir with the train pipe and blank the brake cylinder port, and in a fourth position to connect the main reservoir with the train pipe and connect the brake cylinder port with the atmosphere.

27. An engineer's brake valve provided with ports communicating with the atmosphere, train pipe, main reservoir, equalizing reservoir and a brake cylinder, and a valve provided with cavities and passages coöperating with said ports and arranged in one position to connect the main reservoir with the train pipe and connect the brake cylinder port with the atmosphere, in another position to connect the main reservoir by way of a reducing valve to the train pipe and also to the equalizing reservoir and blank the brake cylinder port, and in another position to connect the main reservoir with the brake cylinder port and blank the train pipe and equalizing reservoir ports.

MURRAY CORRINGTON.

Witnesses:
MALCOLM N. BUTLER,
M. M. EVANS.

---

Copies of this patent may be obtained for five cents each, by addressing the "Commissioner of Patents, Washington, D. C."